(12) United States Patent
Manocha et al.

(10) Patent No.: US 11,226,407 B2
(45) Date of Patent: Jan. 18, 2022

(54) VEHICLE RADAR SYSTEM ARRANGED FOR DETERMINING AN UNOCCUPIED DOMAIN

(71) Applicant: VEONEER SWEDEN AB, Vargarda (SE)

(72) Inventors: Ashish Manocha, Kanazawa Ku (JP); Yi Zhou, Grobenzell (DE); Andreas Schmid, Dachau (DE); Martin Hofmann, Puchheim (DE)

(73) Assignee: VEONEER SWEDEN AB, Vargarda (SE)

( * ) Notice: Subject to any disclaimer, the term of this patent is extended or adjusted under 35 U.S.C. 154(b) by 260 days.

(21) Appl. No.: 16/062,434

(22) PCT Filed: Dec. 16, 2016

(86) PCT No.: PCT/EP2016/081459
§ 371 (c)(1),
(2) Date: Jun. 14, 2018

(87) PCT Pub. No.: WO2017/103129
PCT Pub. Date: Jun. 22, 2017

(65) Prior Publication Data
US 2018/0356508 A1    Dec. 13, 2018

(30) Foreign Application Priority Data

Dec. 17, 2015  (EP) .................................. 15200692

(51) Int. Cl.
| *G01S 13/536* | (2006.01) |
| *G01S 13/42* | (2006.01) |
| *G01S 13/931* | (2020.01) |

(52) U.S. Cl.
CPC ............ *G01S 13/536* (2013.01); *G01S 13/42* (2013.01); *G01S 13/931* (2013.01); *G01S 2013/93271* (2020.01)

(58) Field of Classification Search
CPC ............................... G01S 13/536; G01S 13/42
See application file for complete search history.

(56) References Cited

U.S. PATENT DOCUMENTS

| 5,045,856 | A | * | 9/1991 | Paoletti | ................... G01S 13/87 342/70 |
| 5,758,298 | A | * | 5/1998 | Guldner | ................ G01S 15/931 318/580 |

(Continued)

FOREIGN PATENT DOCUMENTS

| EP | 0 396 611 B1 | 12/1994 |
| JP | H 05-203737 A | 8/1993 |

(Continued)

OTHER PUBLICATIONS

International Search Report and Written Opinion of PCT/EP2016/081459 dated Mar. 15, 2017.

*Primary Examiner* — Marcus E Windrich
(74) *Attorney, Agent, or Firm* — Dickinson Wright PLLC (57) ABSTRACT

A vehicle radar system (3) and related method including at least one transceiver arrangement (7) arranged to generate and transmit radar signals (4), and to receive reflected radar signals (5). The radar signals form a plurality of sensing sectors or sensing bins (8a-8g), that together form a transceiver coverage (9), For each sensing bin (8a-8g) the radar system (3) is arranged to obtain a target angle (φ) and a target range (r) to possible target objects (10a-10j). The radar system (3) is further arranged to determine an unoccupied domain border (11) and a corresponding unoccupied domain (12) for the radar transceiver coverage (9).

14 Claims, 7 Drawing Sheets

(56) References Cited

U.S. PATENT DOCUMENTS

| | | | | |
|---|---|---|---|---|
| 6,002,983 | A * | 12/1999 | Alland | G01S 13/66 |
| | | | | 701/301 |
| 6,163,252 | A | 12/2000 | Nishiwaki | |
| 7,227,474 | B2 | 6/2007 | Zoratti et al. | |
| 2010/0164701 | A1 * | 7/2010 | Bargman | G01S 5/0252 |
| | | | | 340/436 |
| 2010/0271255 | A1 * | 10/2010 | McKitterick | G01S 13/003 |
| | | | | 342/27 |
| 2016/0161609 | A1 * | 6/2016 | Tanaka | G01S 13/60 |
| | | | | 342/71 |
| 2019/0180502 | A1 * | 6/2019 | Englard | G06T 3/4007 |

FOREIGN PATENT DOCUMENTS

| | | |
|---|---|---|
| JP | 2014-062804 A | 4/2014 |
| JP | 2016-109675 A | 6/2016 |

\* cited by examiner

VEHICLE RADAR SYSTEM ARRANGED FOR DETERMINING AN UNOCCUPIED DOMAIN

CROSS-REFERENCE TO RELATED APPLICATIONS

This application is a 35 U.S.C. § 371 national phase application of PCT International Application No. PCT/EP2016/081459, filed Dec. 16, 2016, which claims the benefit of priority under 35 U.S.C. § 119 to European Patent Application No. 15200692.0, filed Dec. 17, 2015, the contents of which are incorporated herein by reference in their entirety.

FIELD OF THE INVENTION

The present disclosure relates to a vehicle radar system including at least one transceiver arrangement arranged to generate, transmit and receive reflected radar signals. The radar signals form a plurality of sensing sectors, sensing bins, that together form a transceiver coverage area.

BACKGROUND

Many vehicle radar systems include radar transceivers that are arranged for generating radar signals that are transmitted, reflected and received by use of appropriate antennas of the radar system. The radar signals may for example be in the form of FMCW (Frequency Modulated Continuous Wave) signals.

For a collision avoidance system in a vehicle, it is desired to obtain a sufficiently reliable representation of at least a part of the environment surrounding the vehicle and may be formed as a free space representation. Such a representation will include both stationary and moving objects.

U.S. Pat. No. 7,227,474 describes an object detection system where a plurality of sensor fields form a transceiver coverage area, and are overlaid on a desired detection zone. A range gate is a distance from the sensor where a sensing field and a desired detection zone overlap, and if an object has a range less than the range gate, the object will be determined as within the desired detection zone.

It is however desired to obtain a more flexible vehicle radar system for determining a free space representation of at least a part of the environment surrounding the vehicle.

The object of the present disclosure is thus to provide a vehicle radar system for determining a free space representation of at least a part of the environment surrounding the vehicle that is more flexible than prior art systems.

This object is achieved by use of a vehicle radar system having at least one transceiver arrangement. The transceiver arrangement is arranged to generate and transmit radar signals, and to receive reflected radar signals, where the transmitted radar signals have been reflected by one or more objects. The radar signals form a plurality of sensing sectors, sensing bins, that together form a transceiver coverage. For each sensing bin the radar system is arranged to obtain a target angle and a target range to possible target objects. The radar system is further arranged to determine an unoccupied domain border and a corresponding unoccupied domain for the radar transceiver coverage.

The above-described object is also achieved by use of an exemplary method for a vehicle radar system, where the method includes the steps of:

Generating and transmitting radar signals.

Receiving reflected radar signals, where the transmitted radar signals have been reflected by one or more objects, where the radar signals form a plurality of sensing sectors, sensing bins that together form a transceiver coverage.

Obtaining a target angle and a target range to possible target objects for each sensing bin.

Determining an unoccupied domain border and a corresponding unoccupied area for the radar transceiver coverage.

According to an example embodiment of the present invention, the sensing bins have a non-uniform angular size.

According to another example embodiment, the vehicle radar system is arranged to independently pre-classify detections into moving or stationary detections.

According to another example embodiment, the radar system is arranged to be installed in a vehicle, and is arranged to perform the pre-classification by performing an analysis of the Doppler velocity and the angle of each detected target object with respect to motion and yaw rate of the vehicle.

According to another example embodiment, the vehicle radar system includes a detection memory that is arranged to store detections observed in a certain number of radar cycles.

According to another example embodiment, the radar system is arranged to calculate the unoccupied domain border in each sensing bin by choosing the closest stationary target objects in each sensing bin within the set of all stored detections in the detection memory.

Other example embodiments are disclosed in the following description and appended drawings.

A number of advantages are obtained by use of the present disclosure. Mainly, a vehicle radar system is provided for determining a free space representation of at least a part of the environment surrounding the vehicle in a more flexible manner than prior art systems.

BRIEF DESCRIPTION OF THE DRAWING

Exemplary embodiments of the present disclosure will now be described more in detail with reference to the appended drawings, where.

DETAILED DESCRIPTION

Figure 1:
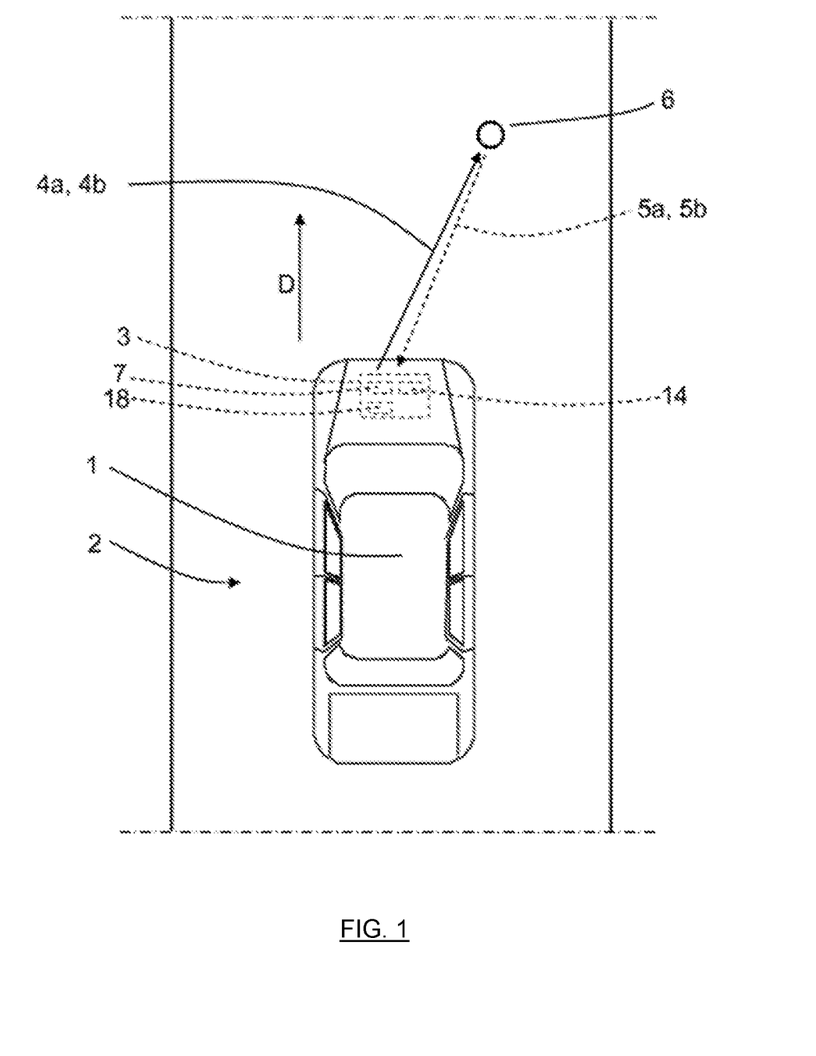
FIG. 1 shows a schematic top view of a vehicle.

FIG. 1 schematically shows a top view of a vehicle 1 arranged to run on a road 2 in a direction D, where the vehicle 1 includes a vehicle radar system 3 which is arranged to distinguish and/or resolve single targets from the surroundings by transmitting signals 4 and receiving reflected signals 5 and using a Doppler effect in a previously well-known manner. The vehicle radar system 3 thus includes a radar transceiver arrangement 7 and is arranged to provide azimuth angles of possible target objects 6 by simultaneously sampling and analyzing phase and amplitude of the received signals 5. The radar signals may for example be in the form of FMCW (Frequency Modulated Continuous Wave) signals operating at 77 GHz. The vehicle radar system 3 also includes a radar control unit (RCU) 18.

Figure 2:
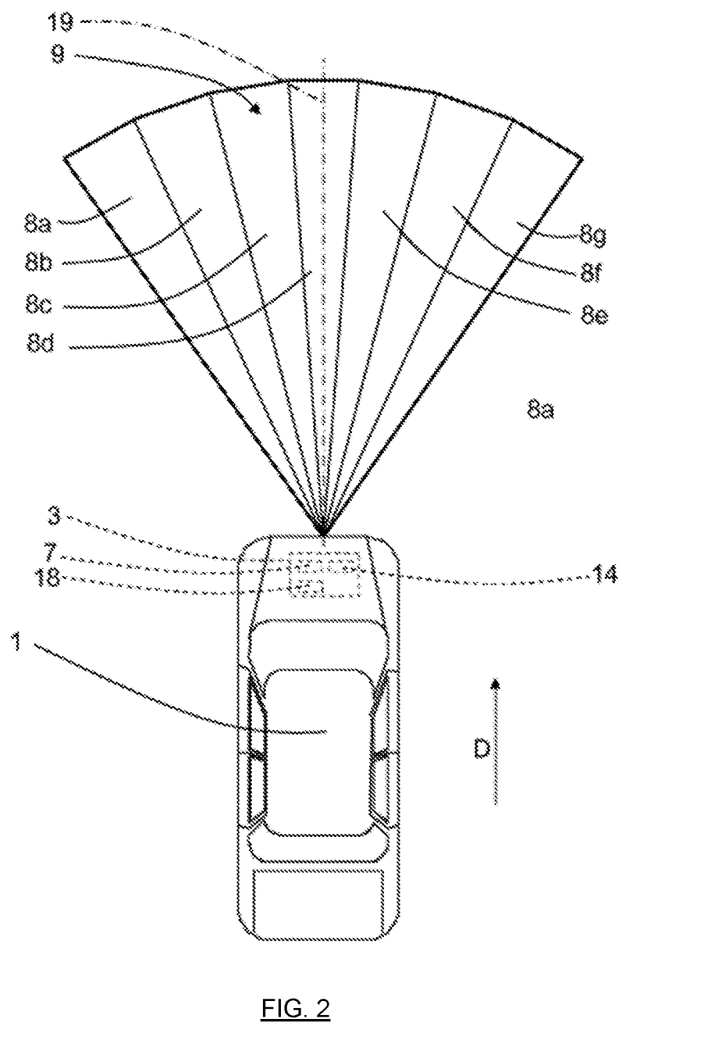
FIG. 2 shows a schematic top view of a vehicle with sensing bins.

As shown in FIG. 2, the radar signals form a plurality of sensing sectors or sensing bins 8a, 8b, 8c, 8d, 8e, 8f, 8g that together form a transceiver coverage area 9, where an angle normal line 19 extends in a forward running direction of the vehicle. The sensing bins 8a, 8b, 8c, 8d, 8e, 8f, 8g each have a wedge shape extending from a common vertex that is located at or adjacent to the radar transceiver arrangement 7. The transceiver coverage area 9 has a wedge shaped which includes the sensing bins 8a, 8b, 8c, 8d, 8e, 8f, 8g abutting one another, with none of the sensing bins 8a, 8b, 8c, 8d, 8e, 8f, 8g overlapping.

Figure 3:
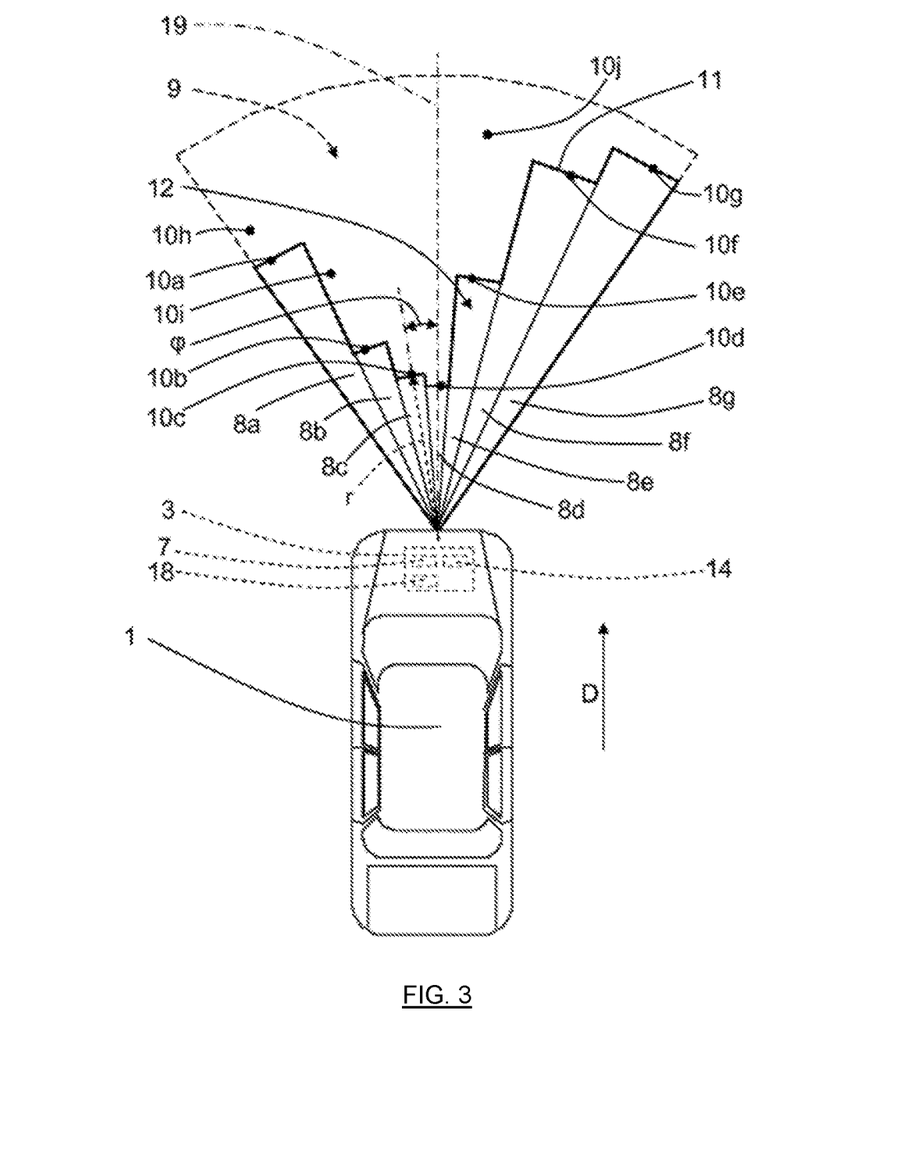
FIG. 3 shows a schematic top view of a vehicle with sensing bins according to an example.

According to the present disclosure, as shown in an example with reference to FIG. 3, for each sensing bin 8a, 8b, 8c, 8d, 8e, 8f, 8g, a target angle φ and a target range r to possible target objects 10a, 10b, 10c, 10d, 10e, 10f, 10g, 10e, 10f, 10g, 10h, 10i, 10j are obtained, such that the RCU 18 is enabled to determine an unoccupied area border 11 and a corresponding unoccupied area 12 for the radar transceiver coverage area 9 by use of polar coordinates. In the rest of the description, only an unoccupied area 12 will be discussed, although a corresponding unoccupied volume is conceivable. For reasons of clarity, the target angle φ and the target range r are only indicated for one target object 10c in FIG. 3, where the target angle φ is determined with respect to the angle normal line 19.

The unoccupied area 12 is within the solid line indicating the unoccupied area border 11. In this example, for each sensing bin 8a, 8b, 8c, 8d, 8e, 8f, 8g, there is a closest detected target object 10a, 10b, 10c, 10d, 10e, 10f, 10g, 10e, 10f, 10g that defines the position of the unoccupied area border 11 at each sensing bin 8a, 8b, 8c, 8d, 8e, 8f, 8g. Target objects outside the determined unoccupied area border 11 are not considered in this example, but may be considered as will be discussed in a further example.

More in detail, the free space is represented as multiple range values, one for each sensing bin 8a, 8b, 8c, 8d, 8e, 8f, 8g in an angle-quantized grid. Thus, the number of range values is identical to the number of sensing bins, where the number of sensing bins depends on the visible angle of the field of view of the radar transceiver and the size of each quantized angle bin.

This means that for each sensing bin 8a, 8b, 8c, 8d, 8e, 8f, 8g, a floating point value describing the free space, range of unoccupied space, for that particular sensing bin is acquired. It is to be noted that a floating point value is not necessary; according to some aspects the value describing the free space is a fixed point or a scaled integer value.

In order to obtain this, for each radar detection cycle, a detection list including radar signal data is used for obtaining range, azimuth angle and Doppler velocity.

Figure 4:
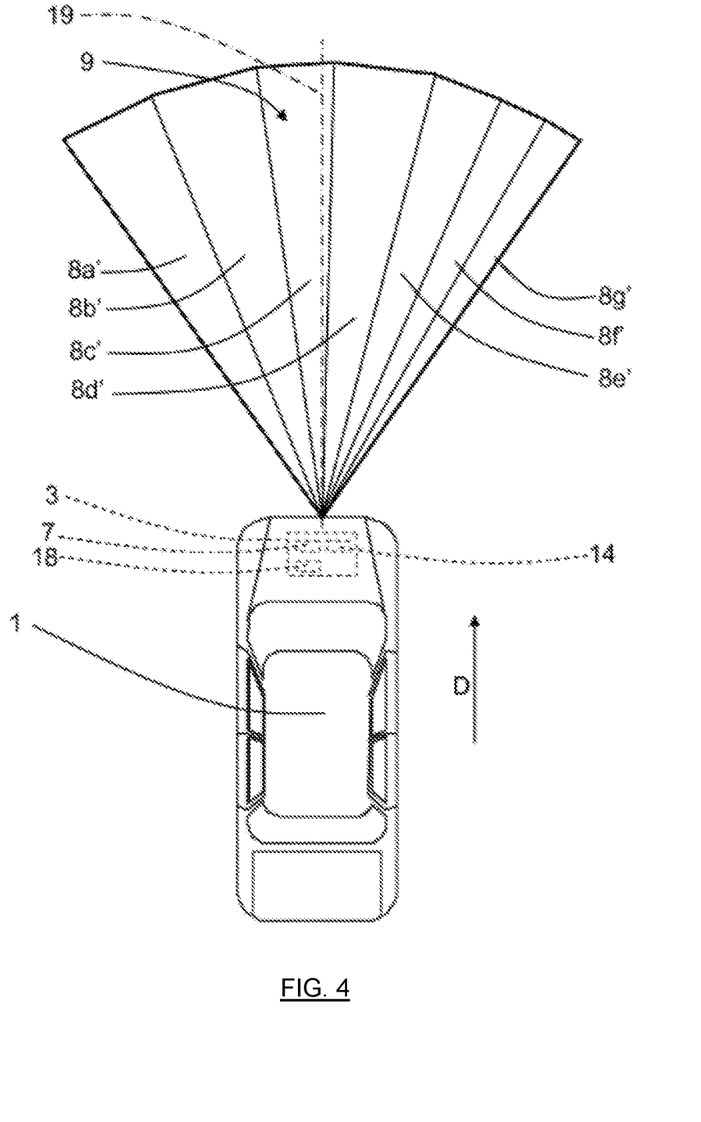
FIG. 4 shows a schematic top view of a vehicle with sensing bins according to another example.

According to an example, with reference to FIG. 4, a non-uniform angular size of the sensing bins 8a', 8b', 8c', 8d', 8e', 8f', 8g' is used which for example is advantageous in certain driving scenarios; for example for country road and high way driving scenarios where free space mainly extends at the front of the transceiver arrangement 7. In these cases, a higher resolution in the driving direction D and a lower resolution to the side can be used. Any suitable type of non-uniform angular size of the sensing bins is of course conceivable; according to some aspects the sensing bins may have a smaller angular size in front of the vehicle and an increasing angular size towards the sides of the transceiver coverage area 9.

According to an example, the vehicle radar system 3 includes a detection memory 14 that is used to increase robustness by storing detections observed in a certain number N of previous radar cycles. Such previous radar cycle detections are considered when determining the present unoccupied area border for the sensing bins.

According to an example, detections are independently pre-classified into moving or stationary detections. By analyzing the Doppler velocity and the angle of each detection with respect to the host-motion and the yaw rate, each detection can be pre-classified as either moving or stationary. Taking yaw rate into consideration benefits in curved drives, such as for example roundabouts.

Detections are further, according to some aspects, fully classified into either the class of stationary objects, or individual motion classes for each moving object. This is achieved by incorporating output from a suitable general object tracking algorithm. Pre-classified detections can thus robustly be classified as moving or stationary.

Detections from previous cycles which are stored in the detection memory 14 are corrected by their combined motion or group motion. For the relevant group of stationary detections, this means compensating the position, x and y coordinates, by the change in the vehicle position and rotation as obtained through processing of vehicle velocity and yaw rate. Other detections, for example belonging to objects moving in the observable area, the transceiver coverage area 9, are corrected by the same mechanism and are in addition propagated by their group motion vector.

According to some aspects, to calculate the free space border 11 in each sensing bin 8a, 8b, 8c, 8d, 8e, 8f, 8g, the RCU 18 is arranged to choose the closest stationary target objects 10a, 10b, 10c, 10d, 10e, 10f, 10g, 10e, 10f, 10g in each sensing bin 8a, 8b, 8c, 8d, 8e, 8f, 8g within the set of all stored detections in the detection memory 14. The range of the free space border 11 is then given by the range of these closest target objects 10a, 10b, 10c, 10d, 10e, 10f, 10g, 10e, 10f, 10g, 10h, 10i, 10j.

To increase robustness against outliers and spurious detections within the free space, a set of closest target objects in a given bin can be considered. Most of all, not the closest stationary target objects n, but the second, third, . . . , n-th closest target objects with a given sensing bin can be chosen.

Figure 5:
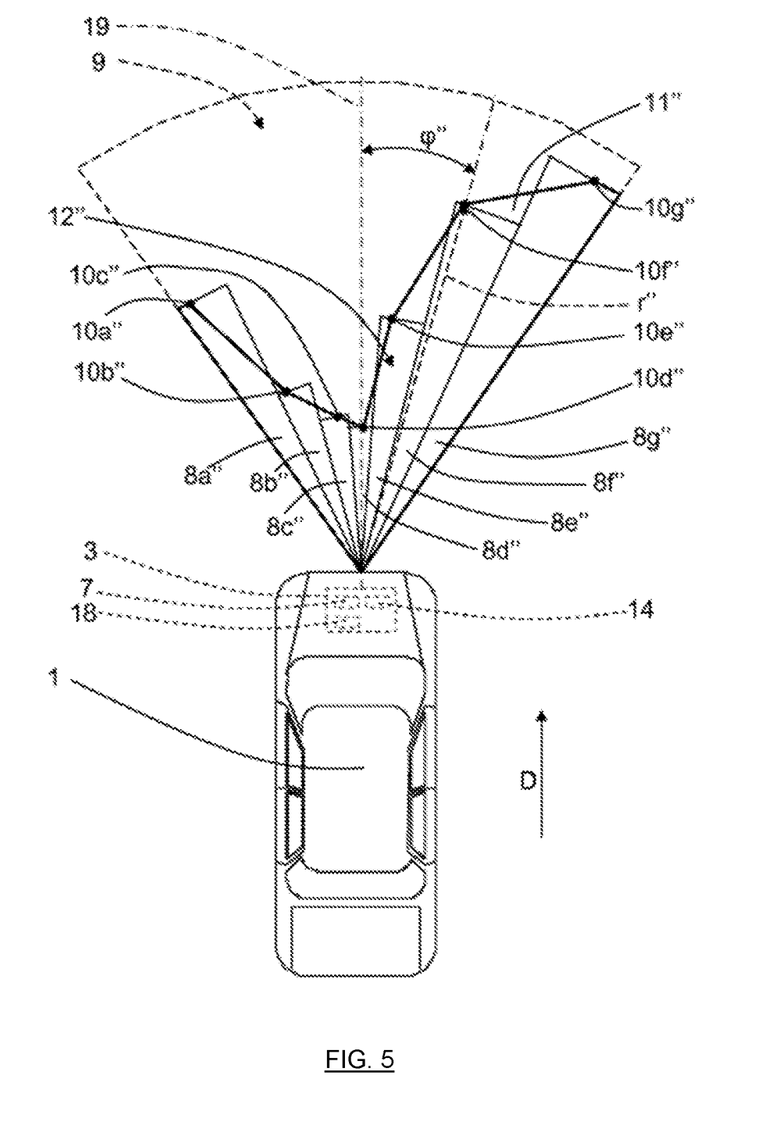
FIG. 5 shows a schematic top view of a vehicle with sensing bins according to another example.

Especially for a coarse angular grid (i.e. low number of bins), the representation of the free space border can appear uneven and discontinuous, since the information in each bin is reduced to one range value. With reference to FIG. 5, showing another example, in addition to the range value for each sensing bin 8a″, 8b″, 8c″, 8d″, 8e″, 8f″, 8g″, an angle value can be stored for each sensing bin 8a″, 8b″, 8c″, 8d″, 8e″, 8f″, 8g″ representing the precise position, given by range and angle, of the closest detection 10a″, 10b″, 10c″, 10d″, 10e″, 10f″, 10g″, 10e″, 10f″, 10g″ in each sensing bin 8a″, 8b″, 8c″, 8d″, 8e″, 8f″, 8g″.

The fact that each bin has an individual angle in this example is indicated in FIG. 5 for a sixth detection that has a target angle φ″ with respect to the angle normal line 19 and a range r″. This increases the memory requirements, but it gives a more detailed free space representation and allows for a more precise and natural road boundary visualization. This provides a slightly different unoccupied area representation 12″, since the unoccupied area border 11″ runs between the detections 10a″, 10b″, 10c″, 10d″, 10e″, 10f″, 10g″, 10e″, 10f″, 10g″.

This gives a smoother unoccupied area border representation and provides a more precise localization of the detected object 10a″, 10b″, 10c″, 10d″, 10e″, 10f″, 10g″, 10e″, 10f″, 10g″ in each sensing bin 8a″, 8b″, 8c″, 8d″, 8e″, 8f″, 8g″.

If no detection is available within a certain sensing bin, the corresponding free space boundary is set to the default maximum range value. This can be undesirable, if adjacent bins have a well observable range boundary. Angular smoothing can be added to overcome this problem. This is done by adding a filter such as for example a sliding window minimum filter of the range boundary values over adjacent sensing bins.

Figure 6:
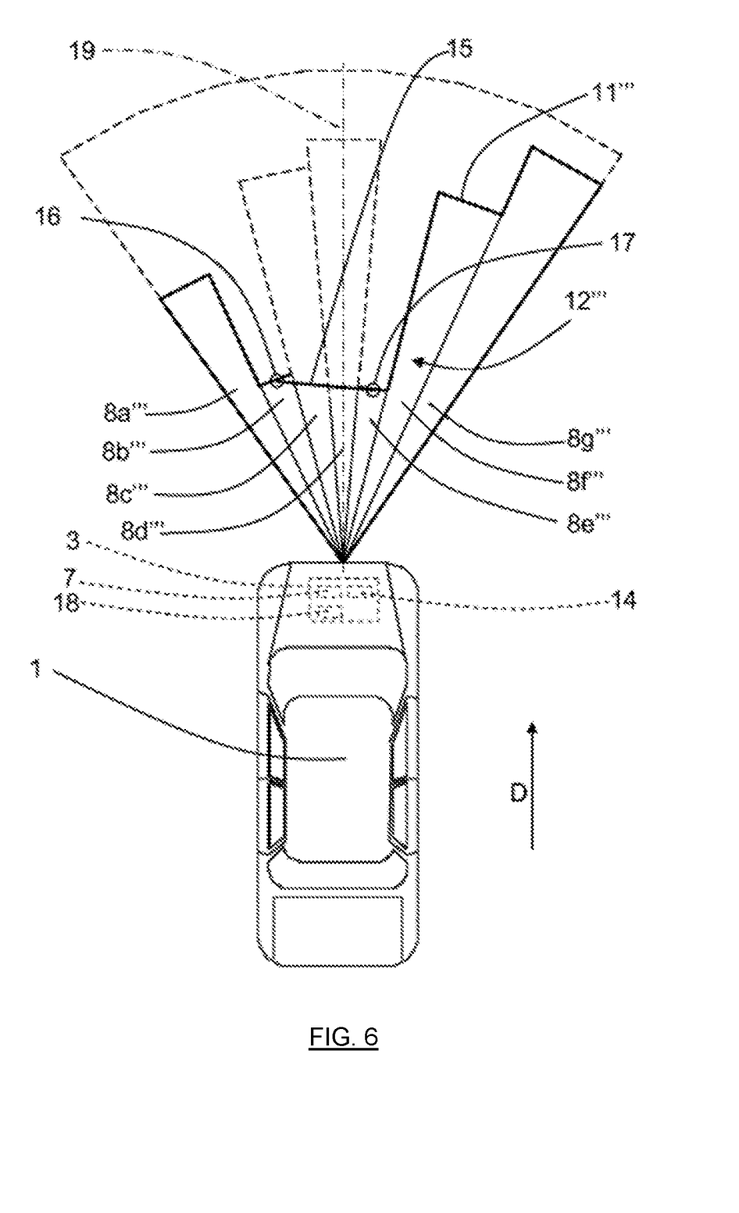
FIG. 6 shows a schematic top view of a vehicle with sensing bins according to another example.

In addition to the angular smoothing, with reference to FIG. 6, a further smoothing procedure significantly improves performance. For this, the Cartesian coordinates of each sensing bin 8a‴, 8b‴, 8c‴, 8d‴, 8e‴, 8f‴, 8g‴ defined by the angle of the bin center and the range value of that sensing bin, are considered. If the Euclidean distance between the Cartesian coordinates of any two sensing bins i, j is less than a desired minimum value, the range value of any intermediate sensing bin k is smoothed.

This smoothing is done by interpolating between the Cartesian coordinates of bin i and j and ensuring that the range of the intermediate bins k does not exceed a smoothing threshold value in the form of an interpolated range value. If the interpolated range value is exceeded, the intermediate bins are smoothed from their original appearance. This means that in this example a third sensing bin 8c‴ and a fourth sensing bin 8d‴ are smoothed from their original appearance, as indicated with a dashed line, to a reduced form that is limited by an interpolation line border line 15 running between the Cartesian coordinates 16, 17 (symbolically indicated with circles) of an adjacent second sensing bin 8b‴ and fifth sensing bin 8e‴.

The representation in angular sensing bins, constituting a polar representation, is natural, efficient, robust and generic.

A polar representation is natural because the input data is generated in polar coordinates, contrary to the current state of the art in free space modeling that use a uniformly spaced Cartesian grid. The representation is efficient, because a full field of view can be represented in a relatively low number of range values and allows for efficient transmission of the determined free space to other processing units. The representation is robust, since a robust filtering of noise is enabled. The representation is generic because it allows a representation of free space in all driving scenarios. No prior assumptions regarding surroundings have to be made, working likewise on a highway, a country road, at city driving, or at narrow parking lots.

As indicated in FIG. 1, the vehicle 1 includes a safety control unit 35 and safety system 36, for example an emergency braking system and/or an alarm signal device. The safety control unit 35 is arranged to control the safety system 36 in dependence of input from the radar system 3.

Figure 7:
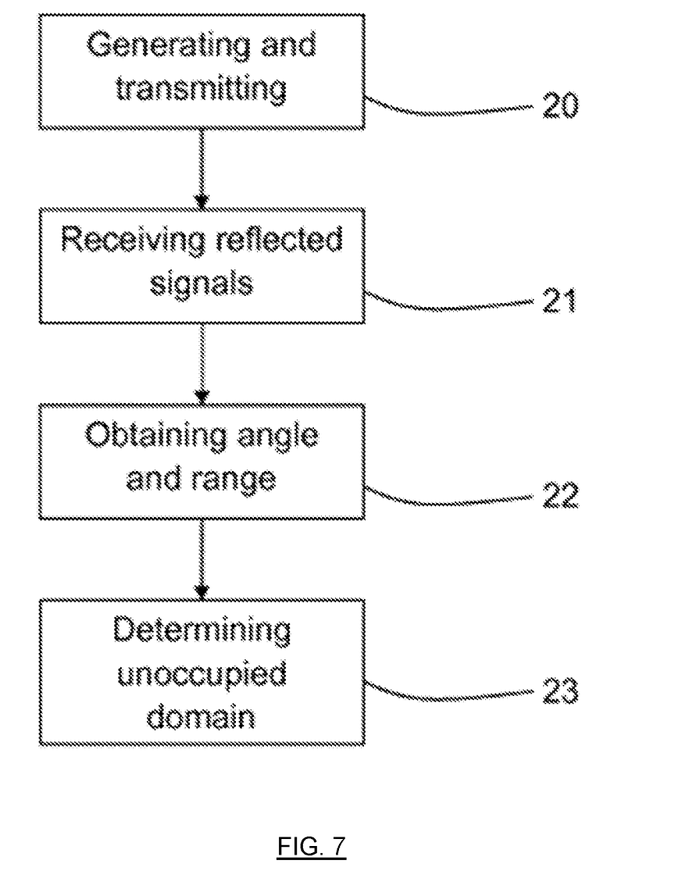
FIG. 7 shows a flowchart for a method according to the present disclosure.

With reference to FIG. 7, the present disclosure relates to a method for a vehicle radar system, where the method includes the steps of:

Step 20: Generating and transmitting radar signals 4;

Step 21: Receiving reflected radar signals 5, where the transmitted radar signals 4 have been reflected by one or more objects 6, where the radar signals form a plurality of sensing sectors, sensing bins 8a, 8b, 8c, 8d, 8e, 8f, 8g, that together form a transceiver coverage 9, Step 22: Obtaining a target angle φ and a target range r to possible target objects 10a, 10b, 10c, 10d, 10e, 10f, 10g, 10e, 10f, 10g, 10h, 10i, 10j for each sensing bin 8a, 8b, 8c, 8d, 8e, 8f, 8g; and Step 23: Determining an unoccupied domain border 11 and a corresponding unoccupied domain 12 for the radar transceiver coverage 9.

The present disclosure is not limited to the example embodiments herein described. For example, the radar system may be implemented in any type of vehicle such as cars, trucks and buses as well as boats and aircraft.

The radar transceiver 7 is adapted for any suitable type of Doppler radar. There may be any number of radar transceivers 7 in the vehicle radar system 3, and they may be arranged for transmission and signals in any suitable direction. The plurality of sensing sectors or sensing bins may thus be directed in other desirable directions, such as rearwards or at the sides of the vehicle 1.

In this context, a radar cycle is one observation phase in which the radar acquires data, processes the date on several signal processing levels and sends out available results. This can be a fixed time interval (i.e. 40 to 60 milliseconds), or it can be a dynamic time interval depending on environment conditions and processing load.

Since an unoccupied volume also is conceivable for the present disclosure, the unoccupied area 12 is generally constituted by an unoccupied domain 12 and the unoccupied area border 11 is generally constituted by an unoccupied domain border 12. Correspondingly, the transceiver coverage area 9 is generally constituted by a transceiver coverage.

All detections correspond to detected target objects.

According to an aspect, other coordinates than polar coordinates are used, for example Cartesian coordinates.

Generally, the present disclosure relates to vehicle radar system 3 including at least one transceiver arrangement 7 arranged to generate and transmit radar signals 4, and to receive reflected radar signals 5, where the transmitted radar signals 4 have been reflected by one or more objects 6, where the radar signals form a plurality of sensing sectors, sensing bins 8a, 8b, 8c, 8d, 8e, 8f, 8g, that together form a transceiver coverage 9. For each sensing bin 8a, 8b, 8c, 8d, 8e, 8f, 8g the radar system 3 is arranged to obtain a target angle φ and a target range r to possible target objects 10a, 10b, 10c, 10d, 10e, 10f, 10g, 10e, 10f, 10g, 10h, 10i, 10j, where the radar system 3 further is arranged to determine an unoccupied domain border 11 and a corresponding unoccupied domain 12 for the radar transceiver coverage 9.

According to an example embodiment, the sensing bins 8a′, 8b′, 8c′, 8d′, 8e′, 8f′, 8g′ have a non-uniform angular size.

According to an example embodiment, the vehicle radar system 3 is arranged to independently pre-classify detections into moving or stationary detections.

According to an example embodiment, the radar system 3 is arranged to be installed in a vehicle 1, and where the radar system 3 further is arranged to perform the pre-classification by performing an analysis of the Doppler velocity and the angle φ of each detected target object 10a, 10b, 10c, 10d, 10e, 10f, 10g, 10e, 10f, 10g, 10h, 10i, 10j with respect to motion and yaw rate of the vehicle 1.

According to an example embodiment, the vehicle radar system 3 includes a detection memory 14 that is arranged to store detections observed in a certain number N of radar cycles.

According to an example embodiment, the radar system 3 is arranged to calculate the unoccupied domain border 11 in each sensing bin 8a, 8b, 8c, 8d, 8e, 8f, 8g by choosing the closest stationary target objects 10a, 10b, 10c, 10d, 10e, 10f, 10g, 10e, 10f, 10g in each sensing bin 8a, 8b, 8c, 8d, 8e, 8f, 8g within the set of all stored detections in the detection memory 14.

According to an example embodiment, the unoccupied area border 11" runs between the detections 10a", 10b", 10c", 10d", 10e", 10f", 10g", 10e", 10f", 10"g.

According to an example embodiment, the vehicle radar system 3 is arranged to perform a smoothing procedure that is arranged to:
Interpolate between the Cartesian coordinates of two sensing bins 8b''', 8e''';
Check whether the range of intermediate bins 8c''', 8d'''' exceed a smoothing threshold value; and,
If the smoothing threshold value is exceeded, to smooth the intermediate bins 8c''', 8d'''' from their original values.

Generally, the present disclosure also relates to a method for a vehicle radar system, where the method includes:
Step 20: Generating and transmitting radar signals 4;
Step 21: Receiving reflected radar signals 5, where the transmitted radar signals 4 have been reflected by one or more objects 6, where the radar signals form a plurality of sensing sectors, sensing bins 8a, 8b, 8c, 8d, 8e, 8f, 8g, that together form a transceiver coverage 9;
Step 22: Obtaining a target angle φ and a target range r to possible target objects 10a, 10b, 10c, 10d, 10e, 10f, 10g, 10e, 10f, 10g, 10h, 10i, 10j for each sensing bin 8a, 8b, 8c, 8d, 8e, 8f, 8g; and
Step 23: Determining an unoccupied domain border 11 and a corresponding unoccupied area 12 for the radar transceiver coverage 9.

According to an example embodiment, the sensing bins 8a', 8b', 8c', 8d', 8e', 8f', 8g' have a non-uniform angular size.

According to an example embodiment, the method includes the steps of independently pre-classifying detections into moving or stationary detections.

According to an example embodiment, the pre-classification is performed by analyzing the Doppler velocity and the angle φ of each detected target object 10a, 10b, 10c, 10d, 10e, 10f, 10g, 10e, 10f, 10g, 10h, 10i, 10j with respect to motion and yaw rate of a vehicle 1.

According to an example embodiment, the method includes storing detections observed in a certain number N of radar cycles.

According to an example embodiment, the method includes calculating the unoccupied domain border 11 in each sensing bin 8a, 8b, 8c, 8d, 8e, 8f, 8g by choosing the closest stationary target objects 10a, 10b, 10c, 10d, 10e, 10f, 10g, 10e, 10f, 10g in each sensing bin 8a, 8b, 8c, 8d, 8e, 8f, 8g within the set of all stored detections.

According to an example embodiment, the unoccupied area border 11" runs between the detections 10a", 10b", 10c", 10d", 10e", 10f", 10g", 10e", 10f", 10g".

According to an example embodiment, the method includes a smoothing procedure which in turn includes the steps of:
Interpolating between the Cartesian coordinates of two sensing bins 8b''', 8e''';
Checking whether the range of intermediate bins 8c''', 8d'''' exceed a smoothing threshold value; and
If the smoothing threshold value is exceeded, smoothing the intermediate bins 8c''', 8d'''' from their original values.

While the above description constitutes the preferred embodiment of the present invention, it will be appreciated that the invention is susceptible to modification, variation and change without departing from the proper scope and fair meaning of the accompanying claims.

The invention claimed is:

1. A method for a vehicle radar system, where the method comprises the steps of:
generating and transmitting radar signals by a transceiver arrangement;
receiving reflected radar signals, where the transmitted radar signals have been reflected by one or more target objects, where the radar signals form a plurality of sensing sectors, defining related sensing bins having non-uniform angular sizes, that together form a transceiver coverage,
obtaining a target angle and a target range to the one or more target objects for each of the sensing bin; and
determining an unoccupied domain border and a corresponding unoccupied area for the radar transceiver coverage;
wherein each of the sensing bins defines a region having a common vertex located at or adjacent to the transceiver arrangement; and
wherein the method further comprises a smoothing procedure having the steps of:
interpolating a line between Cartesian coordinates of two of the sensing bins defining an intermediate bin therebetween, the Cartesian coordinates of each sensing bin being defined by a center angle and a range value; and
smoothing the intermediate bin in response to a Euclidean distance between the Cartesian coordinates of the two of the sensing bins being less than a predetermined value, wherein smoothing the intermediate bin includes determining a smoothing threshold based on the line between the Cartesian coordinates of the two of the sensing bins, and limiting a range value of the intermediate bin not to exceed the smoothing threshold value.

2. The method according to claim 1, wherein the method further comprises independently conducting pre-classification of the detections of the one or more target objects into moving or stationary detections.

3. The method according to claim 2, further comprising, the pre-classification is performed by analyzing the Doppler velocity and the angle of the target object with respect to the motion and the yaw rate of a vehicle.

4. The method according to claim 1, wherein the method comprises storing detections of the target objects observed in a certain number of radar cycles.

5. The method according to claim 4, wherein the method further comprises calculating the unoccupied domain border in each of the sensing bins by choosing the target object which is a closest stationary target object in each of the sensing bins within a set of all stored detections of the target objects.

6. The method according to claim 5, wherein the unoccupied area border extends between the stored detections.

7. The method according to claim 1, wherein each of the sensing bins is non-overlapping with any other ones of the sensing bins.

8. A vehicle radar system comprising at least one transceiver arrangement configured to generate and transmitted radar signals, and to receive reflected radar signals, where the transmitted radar signals have been reflected by one or more target objects, where the transmitted and reflected radar signals form a plurality of sensing sectors defining a plurality of related sensing bins that together form a transceiver coverage, for each sensing bin the radar system is configured to obtain a target angle and a target range to the one or more target objects, where the radar system further is configured to determine an unoccupied domain border and a corresponding unoccupied domain for the transceiver coverage, and wherein each of the sensing bins defines a region having a common vertex located at or adjacent to the transceiver arrangement;

wherein the vehicle radar system is configured to perform a smoothing procedure that includes:

interpolating a line between Cartesian coordinates of two of the sensing bins forming an intermediate bin therebetween, the Cartesian coordinates of each sensing bin being defined by a center angle and a range value; and smoothing the intermediate bin in response to a Euclidean distance between the Cartesian coordinates of the two of the sensing bins being less than a predetermined value, wherein smoothing the intermediate bin includes determining a smoothing threshold based on the line between the Cartesian coordinates of the two of the sensing bins, and limiting a range value of the intermediate bin not to exceed the smoothing threshold value.

9. The vehicle radar system according to claim 8, further comprising, that the vehicle radar system is configured to independently conduct pre-classification of the detections of the one or more target objects into moving or stationary detections.

10. The vehicle radar system according to claim 9, further comprising, the radar system is configured to be installed in a vehicle, and where the radar system is further configured to perform the pre-classification by performing an analysis of the Doppler velocity and the target angle of the target objects with respect to the motion and the yaw rate of the vehicle.

11. The vehicle radar system according to claim 8, wherein the vehicle radar system further comprises a detection memory that is configured to store detections of the target objects in a certain number of radar cycles.

12. The vehicle radar system according to claim 11, further comprising, the radar system is configured to calculate the unoccupied domain border in each of the sensing bins by choosing the target object which is a closest stationary target object in each of the sensing bins within a set of all stored detections in the detection memory.

13. The vehicle radar system according to claim 12, wherein the unoccupied area border extends between the detections.

14. The vehicle radar system according to claim 8, wherein each of the sensing bins is non-overlapping with any other ones of the sensing bins.

* * * * *